(12) United States Patent
Podzunas et al.

(10) Patent No.: US 11,281,773 B2
(45) Date of Patent: Mar. 22, 2022

(54) ACCESS CARD PENETRATION TESTING

(71) Applicant: International Business Machines Corporation, Armonk, NY (US)

(72) Inventors: Justin Podzunas, Austin, TX (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/690,647

(22) Filed: Nov. 21, 2019

(65) Prior Publication Data
US 2021/0157910 A1    May 27, 2021

(51) Int. Cl.
*G06F 21/55* (2013.01)
*G06K 7/10* (2006.01)

(52) U.S. Cl.
CPC ....... *G06F 21/554* (2013.01); *G06K 7/10366* (2013.01); *G06F 2221/034* (2013.01)

(58) Field of Classification Search
CPC ............. G06F 21/554; G06F 2221/034; G06F 21/577; G06F 21/34; G06K 7/10366
See application file for complete search history.

(56) References Cited

U.S. PATENT DOCUMENTS

| | | | |
|---|---|---|---|
| 7,882,538 B1 | 2/2011 | Palmer | |
| 9,842,338 B1* | 12/2017 | Shukla | .................. G06F 16/955 |
| 2010/0324842 A1* | 12/2010 | Di Iorio | ............... G06K 9/0055 |
| | | | 702/60 |
| 2013/0218931 A1 | 8/2013 | Lewis | |
| 2015/0059937 A1* | 3/2015 | Singer | .................... A45C 11/32 |
| | | | 150/147 |
| 2017/0140134 A1 | 5/2017 | Brough et al. | |

OTHER PUBLICATIONS

Unknown, "ESP32-D0WDQ6—2.4 GHz Wi-Fi & Bluetooth Combo Chip", gridconnect, printed Aug. 1, 2019, 4 pages.
Unknown, "RFID Chips", Top Selected Products and Reviews, Amazon, printed Aug. 1, 2019, 4 pages.
Unknown, "USB Drives, Desktop.ini, and NTLM hashes", Nov. 18, 2016, 12 pages.
Mell et al., "The NIST Definition of Cloud Computing", Recommendations of the National Institute of Standards and Technology, Sep. 2011, 7 pages.

* cited by examiner

*Primary Examiner* — Christopher A Revak
(74) *Attorney, Agent, or Firm* — Jamar K. Ray

(57) ABSTRACT

A method can include obtaining access card data from an access card. The access card can include accessibility data. The access card can be configured to electronically permit access to one or more systems by transmitting the accessibility data. The access card data can include at least a portion of the accessibility data. The method can further include storing the access card data. The method can further include transmitting the access card data to a penetration test system that is configured to test the one or more systems for at least one system vulnerability based, at least in part, on the access card data.

20 Claims, 7 Drawing Sheets

ACCESS CARD PENETRATION TESTING

BACKGROUND

The present disclosure relates to security, and more specifically, to testing for vulnerabilities in systems that employ electronic devices.

Systems (e.g., computer networks, secure facilities, etc.) can be targeted by malicious actors attempting to gain unauthorized access to such systems. Penetration testing can include utilizing tools to discover and fix system vulnerabilities before they can be exploited by malicious actors.

SUMMARY

According to embodiments of the present disclosure, a method can include obtaining access card data from an access card. The access card can include accessibility data. The access card can be configured to electronically permit access to one or more systems by transmitting the accessibility data. The access card data can include at least a portion of the accessibility data. The method can further include storing the access card data. The method can further include transmitting the access card data to a penetration test system that is configured to test the one or more systems for at least one system vulnerability based, at least in part, on the access card data.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
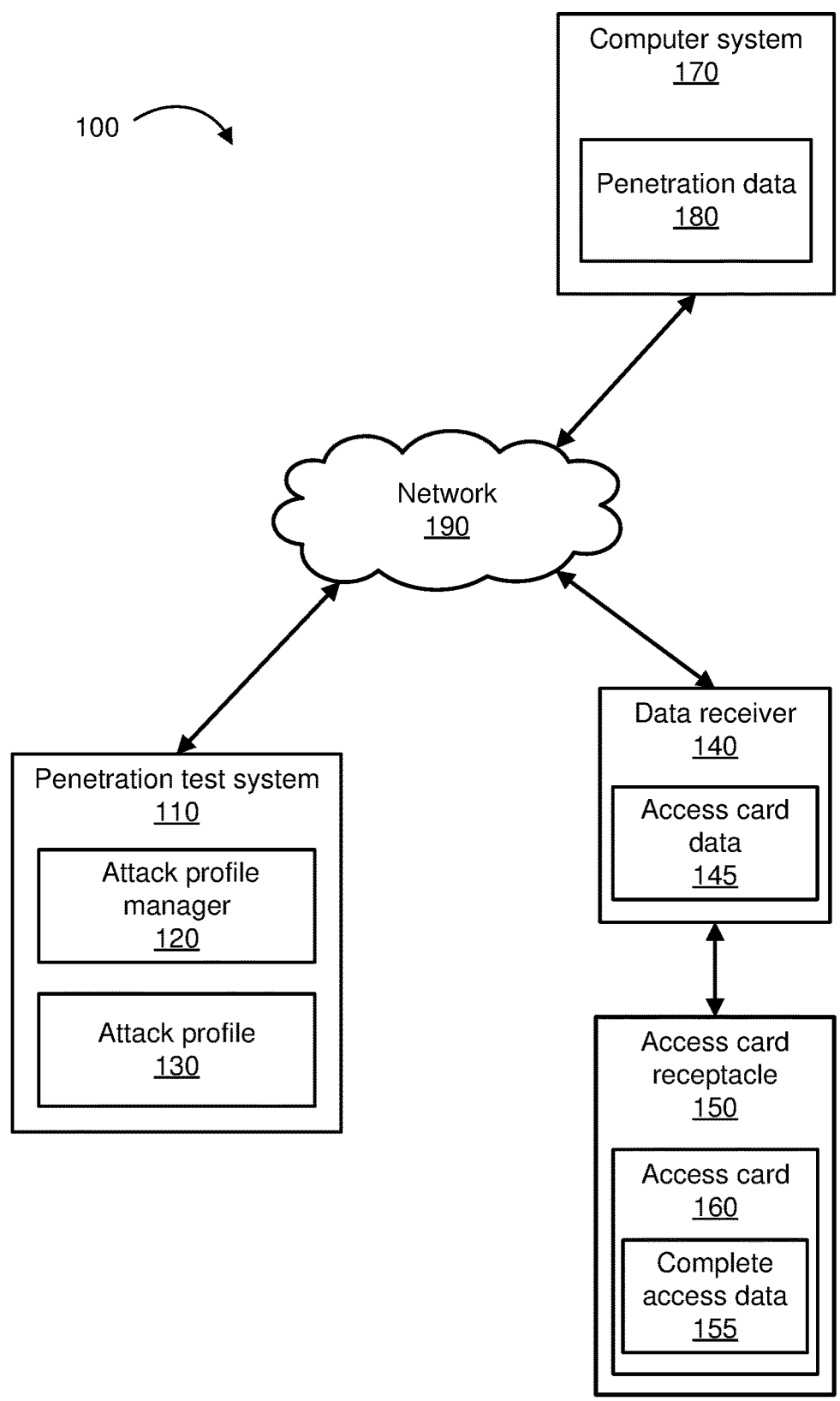
FIG. 1 depicts an example computing environment that includes a penetration test system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to penetration testing; more particular aspects relate to access card penetration testing. While the present disclosure is not necessarily limited to such applications, various aspects of the disclosure may be appreciated through a discussion of various examples using this context.

Hackers can attempt to gain unauthorized access to systems, such as computer networks and secure facilities, to achieve malicious objectives. To prevent such unauthorized access, entities (e.g., corporations, organizations, government agencies, etc.) can authorize penetration testers to attempt to discover system vulnerabilities before such vulnerabilities can be exploited. With the entity's permission, penetration testers can utilize a set of tools on one or more of the entity's systems to identify vulnerabilities in such systems. In some instances, penetration testers can implement techniques that hackers could potentially use to gain access to systems.

One such technique, called a drop attack, can include disseminating a plurality of electronic devices that one or more recipients can utilize, and by such utilization, the one or more recipients can unwittingly provide unauthorized access to a system. For example, a Universal Serial Bus ("USB") drop attack can include distributing a set of USB storage devices (e.g., USB flash drives) that are configured to achieve malicious objectives. Examples of distribution for USB drop attacks can include giveaways of the USB storage devices or simply leaving the USB storage devices in random public places to be found and utilized. When a recipient inserts the obtained USB storage device into the recipient's computer, the USB storage device can initiate a myriad of attacks, such as installing malware onto the computer and/or providing a hacker remote access to the computer. Such attacks can occur completely unbeknownst to the recipient.

In some instances, a penetration tester can utilize a drop attack to test a system's vulnerability. However, due to improved awareness, training, and procedures that have been implemented to prevent USB drop attacks, that particular technique may have limited effectiveness for penetration testing. As technology and security threats evolve, there is a need for penetration test methods to adapt. Additionally, entities can benefit from penetration tests that can identify a plurality of system vulnerabilities that may be present in a variety of systems.

To address these and other issues, embodiments of the present disclosure include a method for performing a penetration test that includes utilizing an access card receptacle to obtain data from an access card, generating an attack profile based, at least in part, on the data, and performing the penetration test based, at least in part, on the attack profile.

In this disclosure, an access card can refer to a physical electronic authorization device, such as a badge or an identification card. In some embodiments, the access card can electronically permit access to one or more systems. In this disclosure, a system can refer to an entity to which access can be restricted, such as a physical structure (e.g., a secure building) and/or an electronic framework (e.g., a secure computing network). Thus, in some embodiments, an access card can electronically permit access to a secure building (e.g., an access card can be used to unlock one or more doors of a secure building by a wireless transmission of data) and/or an access card can electronically permit access to a secure computing network (e.g., an access card can be used to transmit data to a computer to log onto the computer and access secure network files).

In some embodiments, an access card can store accessibility data. Accessibility data can refer to a set of electronic data included on the access card (e.g., an owner name, one or more serial numbers, encryption key data, access codes, passwords, etc.) with which the access card can electronically permit access to one or more systems. In some embodiments, performing a penetration test can include the following steps: obtaining at least a portion of the accessibility data from the access card (the at least a portion of the accessibility data can be referred to as access card data); obtaining penetration data from one or more resources external to the access card (penetration data can include information that can be used alone or in conjunction with the obtained access card data to exploit a system vulnerability); generating an attack profile that includes the obtained access card data and the obtained penetration data; and using the attack profile to attempt to access one or more systems (i.e., to test one or more systems for potential system vulnerabilities). A system vulnerability can include a flaw and/or weakness that can render the system susceptible to intrusion and/or harm (e.g., an unencrypted access code, weak encryption of personally identifiable information, etc.).

Embodiments of the present disclosure can provide a number of benefits; such benefits can be an improvement over penetration testing using the USB drop attack method. Since access cards can permit access to multiple systems (e.g., computer workstations, computer networks, secure facilities, etc.), embodiments of the present disclosure can provide a method to test for system vulnerabilities across multiple systems. In contrast, penetration testing using the USB drop attack method can be limited to systems that include USB ports. Additionally, by utilizing an access card receptacle to obtain access card data, embodiments of the present disclosure can increase an available time period for extracting data from the access card, as attempts to obtain and transmit such data can be executed over the duration of retention of the access card within the access card receptacle. Furthermore, in some embodiments, the ability of the access card receptacle to transmit access data to one or more data receivers can provide the access card receptacle multiple opportunities to transmit data as the access card receptacle is moved to different locations. Thus, embodiments of the present disclosure can provide improved effectiveness in obtaining and transmitting data from access cards.

Turning to the figures, FIG. 1 illustrates an example computing environment 100 that can include a penetration test system 110, and at least one of each of an access card receptacle 150 that can retain an access card 160, a data receiver 140, a network 190, and a computer system 170. In some embodiments, the penetration test system 110, the at least one data receiver 140, and the at least one computer system 170 can exchange data with one another through the at least one network 190. In some embodiments, each of the penetration test system 110, the at least one data receiver 140, the at least one computer system 170, and the at least one network 190 can include a computer system, such as the computer system 501 described with respect to FIG. 5. In some embodiments, the access card receptacle 150 can be identical or substantially similar to the access card receptacle 215, described with respect to FIG. 2. In some embodiments, the access card 160 can be identical or substantially similar to the access card 205 described with respect to FIG. 2. Access card 160 can include accessibility data 155 with which the access card 160 can electronically permit access to one or more systems.

Referring back to FIG. 1, in some embodiments, the penetration test system 110 can include one or more processors configured to perform one or more of the method steps described with respect to FIG. 3. For example, in some embodiments, the attack profile manager 120 can include one or more processors having programming instructions to perform one or more of the method steps described with respect to FIG. 3. In some embodiments, the penetration test system 110 can include memory configured to store at least one attack profile 130. In some embodiments, the penetration test system 110 can be included in a discrete computer system (e.g., a server, laptop computer, etc.) located remotely from at least one of the data receiver 140, access card receptacle 150, and computer system 170. In some embodiments, the penetration test system 110 can be integrated into the data receiver 140. In some embodiments, the penetration test system 110 can be a tool utilized by a penetration tester to perform a penetration test.

In some embodiments, the data receiver 140 can include an electronic device that is configured to obtain and transmit electronic data. For example, the data receiver 140 can include a mobile phone, smart watch, tablet, computer, etc., that is configured to obtain the electronic data (e.g. access card data 145) from the access card receptacle 150 and transmit the electronic data to the penetration test system 110 via the network 190. For example, in some embodiments, the data receiver 140 can establish a wireless connection, such as a BLUETOOTH® connection, with the access card receptacle 150 to obtain access card data 145 from the access card receptacle 150. Continuing with this example, the data receiver 140 can establish a connection to the network 190 and transmit the access card data 145 to the penetration test system 110. In some embodiments, a plurality of data receivers 140 can be configured to obtain electronic data (e.g. access card data 145) from one or more access card receptacles 150.

In some embodiments, the access card receptacle 150 can be configured to obtain at least a portion of the accessibility data 155 from an access card 160. In some embodiments, one or more access card receptacles 150 can be configured to transmit electronic data to one or more data receivers 140. In these embodiments, if an access card receptacle is unable to transfer electronic data to a first data receiver during a first data transfer attempt, the access card receptacle can transfer the electronic data to a second data receiver during a second data transfer attempt. In this way, embodiments of the present disclosure can be configured to provide multiple opportunities to transfer electronic data from one access card receptacle 150 to one or more data receivers 140.

For example, in some embodiments, at a first time, an access card receptacle can be in a first location having a first distance (e.g., 8 meters (m)) from a first data receiver. In this example, the first distance can be within a maximum threshold distance (e.g., 10 m) required for the access card receptacle and the first data receiver to communicate wirelessly. Continuing with this example, at a second time, a transfer of the electronic data from the access card receptacle to the first data receiver may fail due to the access card receptacle being relocated to a second location having a second distance (e.g., 12 m) from the first data receiver. In this example, the transfer of the electronic data may fail because the second distance exceeds the maximum threshold distance (10 m) required for the access card receptacle and the first data receiver to communicate wirelessly. However, the second location of the access card receptacle can have a third distance (e.g., 5 m) from a second data receiver. Furthermore, the third distance can be within a second maximum threshold distance (e.g., 15 m) required for the access card receptacle and the second data receiver to communicate wirelessly. Thus, in this example, at the second time, the access card receptacle can transfer the electronic data to the second data receiver instead of transferring the electronic data to the first data receiver.

In some embodiments, the computer system 170 can include a computing device such as a server, desktop computer, etc., having memory that is configured to store penetration data 180. In some embodiments, the computer system 170 can be configured to communicate with the penetration test system 110 via the network 190.

In some embodiments, the network 190 can be a wide area network (WAN), a local area network (LAN), the Internet, or an intranet. In some embodiments, the network 190 can be substantially similar to, or the same as, cloud computing environment 50 described in FIG. 6.

Figure 2:
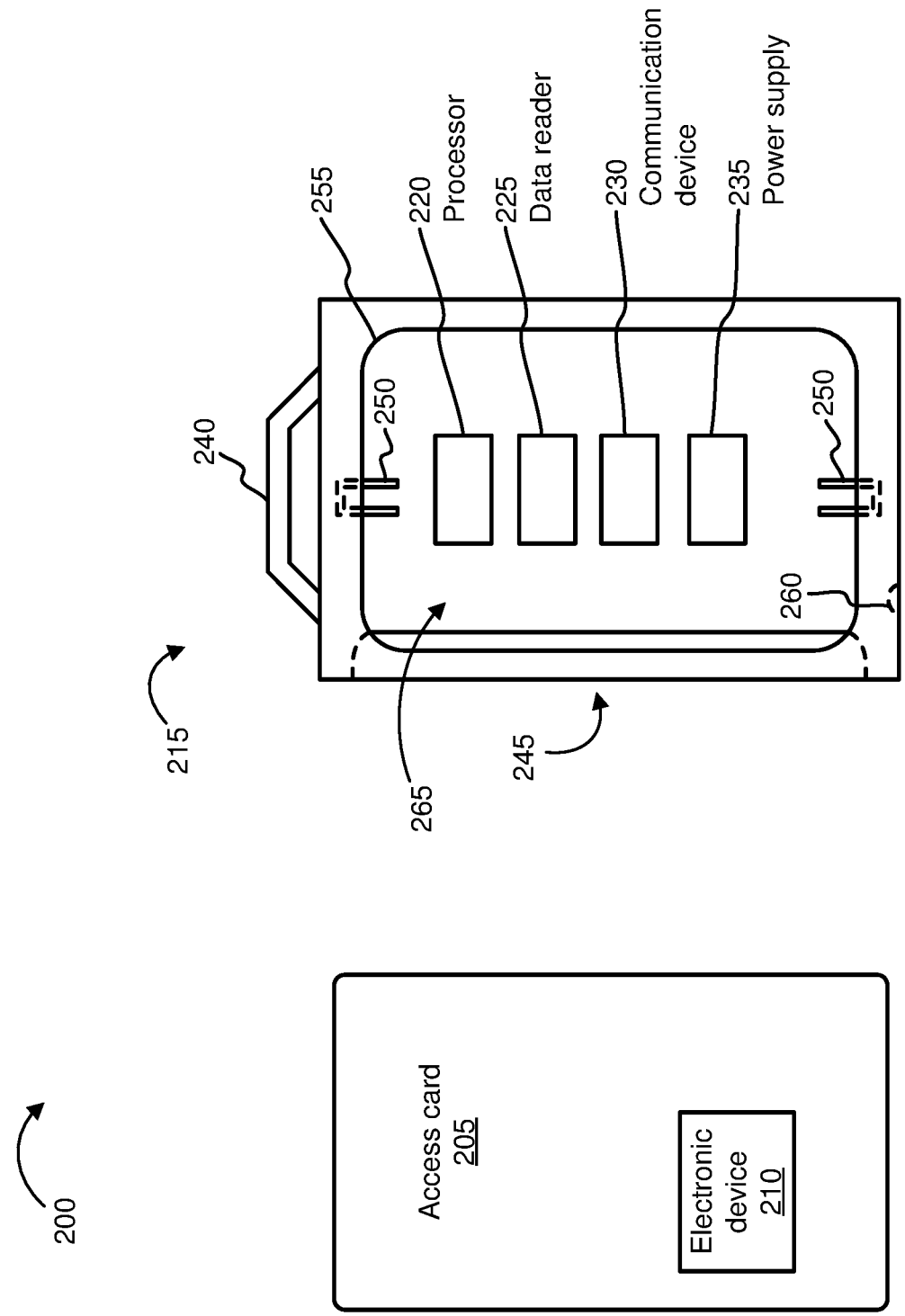
FIG. 2 depicts an example access card and access card receptacle, in accordance with embodiments of the present disclosure.

FIG. 2 depicts an example access card 205 and an example access card receptacle 215 in an unassembled state 200. In an assembled state (not shown) the access card 205 can be retained inside the access card receptacle 215. In some embodiments, the access card 205 can include a physical electronic authorization device, such as a badge or an identification card. The access card 205 can be configured to electronically permit access to one or more systems, such as a computing device, a secure location (e.g., a locked room or building), and/or a computer network. For example, in some embodiments, the access card 205 can be inserted into a receiving slot of a computer to transmit electronic data to the computer and transition the computer from a locked state (in which the computer is inoperable for accessing data) to an unlocked state (in which the computer can be used to access data). In another example, the access card 205 can be placed in close proximity (e.g., within a range of approximately 0.1 centimeters (cm) to approximately 10 cm) to an access-card reading device (not shown) to unlock a door by wirelessly transmitting data.

In some embodiments, the access card 205 can include at least one electronic device 210, such as an embedded integrated circuit chip. In some embodiments, the electronic device 210 can store electronic data. For example, in some embodiments, the electronic device 210 can store information such as a name and/or other personally identifiable information of an owner of the access card, information to identify a provider of the access card, one or more serial numbers, encryption key data, access codes, passwords, etc. In some embodiments, such information can be accessed via at least one method. For example, in some embodiments, the information stored on the electronic device 210 can be accessed via physical contact with the electronic device (e.g., accessing the information using physical electrical contacts), and in some embodiments, such information can be accessed without the need for physical contact (e.g., accessing the information by using radio-frequency ("RF") induction technology).

Access card receptacle 215 can be configured to removably retain access card 205. For example, in some embodiments the access card receptacle 215 can include at least one opening 245, such as an input slot, into which the access card 205 can be inserted. Additionally, in some embodiments, the access card receptacle 215 can include at least one retaining structure 250 that can inhibit the ability of the access card 205 to be removed from the access card receptacle 215. For example, in some embodiments, the at least one retaining structure 250 can include a tab that can apply pressure to the access card 205 to inhibit it from moving. In some embodiments, the at least one retaining structure 250 can include a set of tabs positioned proximate the at least one opening such that the set of tabs creates an obstacle to inserting and removing the access card 205 from the access card receptacle 215. Accordingly, the at least one retaining structure 250 and the opening 245 can provide removable coupling between the access card 205 and the access card receptacle 215.

In some embodiments, the access card receptacle 215 may not include an opening 245, such as an input slot, into which the access card 205 can be inserted. In such embodiments, the access card receptacle 215 can include at least one retaining structure 250, such as a set of clips or tabs, that can retain the access card against a base portion 265 of the access card receptacle 215. Such embodiments can facilitate the ability to removably couple the access card 205 and the access card receptacle 215.

In some embodiments, the access card receptacle 215 can include an attachment structure 240 that can facilitate mounting the access card receptacle for display. For example, in some embodiments, an attachment structure 240 can include a slot through which a lanyard clip can be removably coupled to the access card receptacle 215. In this example, the access card receptacle can be removably coupled to a lanyard that can be worn by a person displaying the access card 205 while the access card 205 is retained within the access card receptacle 215. To facilitate displaying the access card 205, some embodiments can include a window 255. In some embodiments, the window 255 can be a transparent portion of the access card receptacle, through which features (e.g., an identification photograph and/or a user name) of an access card 205 can be observed. In some embodiments, the window 255 can be a hole or an open section of the access card receptacle.

In some embodiments, the access card receptacle 215 can include at least one of each of a data reader 225, a communication device 230, a power supply 235, and a processor 220. The data reader 225 can be configured to obtain electronic data from the access card 205. For example, in some embodiments, the data reader 225 can include a radio-frequency identification ("RFID") reader chip that can obtain electronic data from the electronic device 210 by implementing RF induction technology.

In some embodiments, the power supply 235 can provide power to at least one of the processor 220, the data reader 225, and the communication device 230. In some embodiments, the power supply 235 can provide power to the data reader 225 to enable the data reader 225 to obtain electronic data from the access card 205. In some embodiments, the power supply 235 can include a battery. In some embodiments, the power supply 235 can include a data reader switch 260 (e.g., a mechanical contact switch) that can be triggered upon contact with an access card 205 that is inserted into the access card receptacle 215. In this way, the power supply 235 can be configured to provide power to the data reader 225 for a period of time that begins when the access card 205 is inserted into the access card receptacle 215. Thus, in some embodiments, the data reader 225 can obtain electronic data from the access card in response to a triggering of the data reader switch 260.

In some embodiments, the power supply 235 can include an inductor or a capacitor (not shown) that can obtain power from an access-card reading device when the access card receptacle 215 is placed proximate (e.g., approximately 0.1 cm to approximately 10 cm) the access-card reading device.

In these embodiments, the access-card reading device can emit a wireless interrogation signal (e.g., an electromagnetic signal emitted by the access-card reading device to obtain access card data from an access card). Further in these embodiments, the power supply 235 can respond to the wireless interrogation signal by implementing technology, such as RF induction technology, that allows it to use the wireless interrogation signal to provide power to the data reader 225. In response to the power provided by the power supply 235 to the data reader 225, the data reader 225 can obtain access card data from the access card 205.

For example, in some embodiments, a user can insert an access card 205 into an access card receptacle 215 to store the access card 205 and to facilitate mounting the access card 205 to a lanyard to be worn by the user. In this example, the access card 205 can be a workplace identification card. Further in this example, the access card 205 can be used to unlock doors at the user's workplace. Continuing with this example, when using the access card 205 to unlock a door, the user can place the access card receptacle 215 that retains the access card 205 proximate a wall-mounted access-card reading device. Continuing with this example, the wall-mounted access-card reading device can emit a wireless interrogation signal (e.g., a radio-frequency interrogation signal) to obtain data, such as an authorization code, from the access card 205. Continuing with this example, the radio-frequency interrogation signal emitted by the access-card reading device can be captured by an inductor of the power supply 235 and used to power the data reader 225 such that the data reader 225 can obtain electronic data from the access card 205. Thus, in this example, the data reader 225 can obtain electronic data from the access card 205 in response to the power supply 235 responding to a radio-frequency interrogation signal. Further in this example, the inductor of the power supply 235 can additionally provide power to at least one of the processor 220 and the communication device 230.

In some embodiments, the access card receptacle 215 can include at least one processor 220 that is configured to receive and store electronic data obtained by the data reader 225. In some embodiments, the at least one processor 220 can include a reduced instruction set computing (RISC) architecture. In some embodiments, the at least one processor 220 can be operatively coupled to memory, such as onboard volatile memory (e.g., random-access memory) and/or non-volatile memory included with the access card receptacle 215. By including the at least one processor 220 that is configured to receive and store the electronic data obtained by the data reader 225, embodiments of the present disclosure can be configured to preserve the electronic data so that it can be transmitted at a later time.

For example, in some embodiments, a user can insert an access card 205 into an access card receptacle 215, and a processor 220 can receive and store electronic data obtained by the data reader 225. Continuing with this example, at a later time, the user can remove the access card 205 from the access card receptacle 215 and discard the access card receptacle 215. In this example, the access card receptacle 215 can preserve the electronic data from the access card 205 so that the electronic data can be transmitted at a later time when the access card receptacle 215 is retrieved.

In some embodiments, the access card receptacle 215 can include a communication device 230 that can transmit electronic data from the access card receptacle 215 to a data receiver, such as the data receiver 140 discussed with respect to FIG. 1. In some embodiments, the communication device 230 can implement one or more technologies, such as wireless technologies (e.g., wireless local area networking technology, BLUETOOTH® technology, etc.) to transmit electronic data to the data receiver. For example, in some embodiments, the access card receptacle 215 can include a WI-FI and BLUETOOTH® combination chip that it can use to transmit electronic data.

Figure 3:
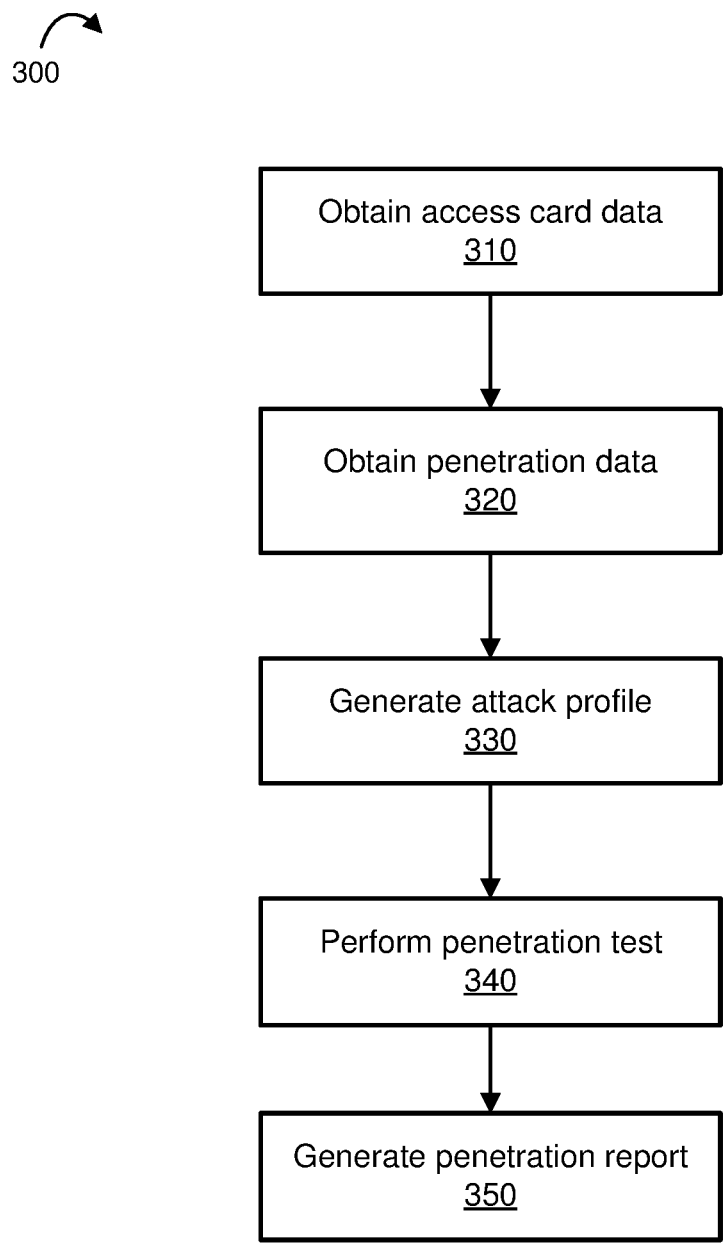
FIG. 3 depicts a flowchart of an example method for generating an attack profile and a penetration report, in accordance with embodiments of the present disclosure.

FIG. 3 illustrates a flowchart of an example method 300 for generating an attack profile, in accordance with embodiments of the present disclosure. The method 300 can be performed by a penetration test system, such as the penetration test system 110 described with respect to FIG. 1.

Referring back to FIG. 3, in step 310, the penetration test system can obtain access card data. In some embodiments, access card data can include at least a portion of accessibility data that can be stored on an access card. Thus, in some embodiments, access card data can include at least a portion of information such as a name of an owner of the access card, one or more serial numbers, encryption key data, access codes, passwords, etc. In some embodiments, step 310 can include the penetration test system obtaining the access card data from a data receiver (e.g., the data receiver 140, discussed with respect to FIG. 1) through a wireless communication network. In some embodiments, step 310 can include the method 400 described with respect to FIG. 4.

In step 320, the penetration test system can obtain penetration data that is based, at least in part, on the access card data obtained in step 310. In some embodiments, penetration data can include information that can be used alone or in conjunction with the obtained access card data to exploit a system vulnerability. For example, in some embodiments, access card data can include a first segment of a two-segment access code required to unlock a facility door. Continuing with this example, penetration data can include the second segment of the two-segment access code. Thus, in this example, combining the access card data with the penetration data can permit the penetration test system to unlock the facility door.

In some embodiments, step 320 can include the penetration test system searching one or more databases that can include information that is relevant to the access card data. In some embodiments, the penetration test system can search archived information that can be relevant the access card data. For example, a database can include previously acquired information regarding a category of access cards (e.g., access cards issued by a particular company or agency). Further in this example, the penetration test system can obtain access card data that identifies an access card as corresponding to a particular category (e.g., the access card was issued by Company A). Continuing with this example, the penetration test system can search for penetration data within a database that includes archived information regarding Company A.

In some embodiments, step 320 can include the penetration test system utilizing a search tool such as a web crawler to obtain penetration data available on one or more Internet resources, such as public websites and/or encrypted online sources that may not be readily accessible (e.g., the "dark web"). In some embodiments, the penetration data can include one or more categories of information, such as RFID exploits (e.g., identified system vulnerabilities associated with the access card), RFID specifications (e.g., an identification of a particular type of access card and/or an identification of a type of chip used in the access card), and directory information (e.g., a list of employee names and corresponding employee numbers that can be used in conjunction with a previously obtained employee number to identify a name of an employee associated with the access card). In some embodiments, penetration data can include information such as identified flaws in an access card or in a type of access card.

In some embodiments, step 330 can include the penetration test system generating an attack profile based, at least in part, on the access card data and/or the penetration data. An attack profile can include information that can be used to attempt to exploit a system vulnerability. For example, an attack profile can include instructions for generating an access code using access card data and penetration data. In this example, such instructions can be utilized by the penetration test system or by a penetration tester to attempt to access a system using the generated access code.

In some embodiments, an attack profile can include a list of one or more potential system vulnerabilities and a list of methods that can be used to attempt to exploit those potential system vulnerabilities. For example, in some embodiments, an attack profile can specify that a particular type of access card includes unencrypted data. In this example, the attack profile can further specify that the unencrypted data can allow duplication of the access card, access to a personal identification number stored on the access card, etc. Thus, in this example, based on the attack profile, the penetration test system and/or a penetration tester can initiate a process to duplicate the access card and attempt to use the duplicate access card. Further in this example, the penetration test system and/or a penetration tester can attempt to access and use the personal identification number stored on the access card. In some embodiments, step 330 can include transmitting and/or displaying the attack profile to a user, such as a penetration tester, so that the user can perform a penetration test (e.g., attempt to exploit a system vulnerability).

In some embodiments, generating an attack profile in step 330 can include comparing access card data with penetration data. For example, in some embodiments, access card data can include a model number that corresponds to physical and/or electrical specifications of the access card. Further in this example, penetration data can include instructions published on the "dark web" to duplicate a set of access cards having a respective set of model numbers. In this example, the penetration test system can compare the model number included in the access card data with the set of model numbers included in the penetration data. Further in this example, if the penetration test system identifies a match between the model number included in the access card data and one of the model numbers included in the penetration data, the penetration test system can generate an attack profile that includes the duplication instructions published on the "dark web."

In a further example, the penetration data can include a set of model numbers that correspond to access cards having an identified flaw, such as weak data encryption. In this example, the penetration test system can compare the model number included in the access card data with the set of model numbers included in the penetration data. Further in this example, if the penetration test system identifies a match between the model number included in the access card data and one of the model numbers included in the penetration data, the penetration test system can generate an attack profile that includes an instruction to attempt to bypass the weak data encryption.

In some embodiments, in step 340, the penetration test system can perform a penetration test based, at least in part, on the attack profile. In some embodiments, performing a penetration test can include the penetration test system using information from the attack profile to attempt to exploit one or more system vulnerabilities, as discussed above.

In some embodiments, in step 350, the penetration test system can generate a penetration report. A penetration report can include a summary of an attack profile and the results of a penetration test (e.g., whether a duplicate access card generated in accordance with an attack profile could successfully be used to gain access to a secure facility and/or a secure computer network). In some embodiments, step 350 can include transmitting and/or displaying the penetration report to a user, such as a site manager of a secure facility or a network administrator.

Figure 4:
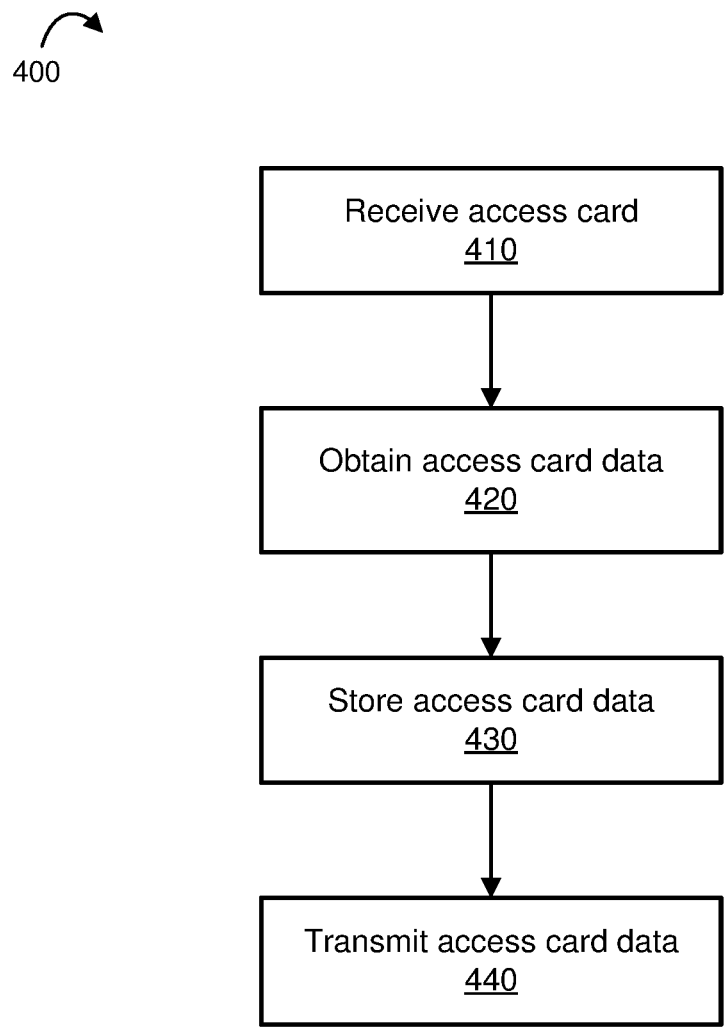
FIG. 4 depicts a flowchart of an example method for obtaining, storing, and transmitting access card data, in accordance with embodiments of the present disclosure.

FIG. 4 depicts a flowchart of an example method 400 for obtaining, storing, and transmitting access card data, in accordance with embodiments of the present disclosure. Method 400 can be performed by an access card receptacle, such as the access card receptacle 150, described with respect to FIG. 1, or the access card receptacle 215 described with respect to FIG. 2.

Referring back to FIG. 4, in step 410, the access card receptacle can receive an access card. For example, in some embodiments, a user can insert an access card into an opening, such as an insertion slot, of the access card receptacle. In some embodiments, receiving the access card can trigger a data reader switch inside the access card receptacle, and such triggering can cause a power supply to provide power to one or more components of the access card receptacle.

In step 420, the access card receptacle can obtain access card data. In some embodiments, step 420 can include a data reader of the access card receptacle obtaining access card data from the access card using RF induction technology. In some embodiments, the data reader can obtain the access card data while the access card is retained within the access card receptacle. In some embodiments, the data reader can obtain the access card data in response to a data reader switch that causes a power supply to supply power to the data reader. In some embodiments, the data reader can obtain the access card data in response to an inductive power supply device supplying power to the data reader when the inductive power supply device responds to a radio-frequency interrogation signal.

In step 430, the access card receptacle can store access card data in memory included in the access card receptacle. By storing the access card data, embodiments of the present disclosure can transmit the access card data while the access card is retained within the access card receptacle and/or after the access card is removed from the access card receptacle, as discussed below.

In step 440, the access card receptacle can transmit access card data. In some embodiments, step 440 can include the access card receptacle establishing wireless communication with a data receiver, such as the data receiver 140 described with respect to FIG. 1. In these embodiments, the access card receptacle can transmit the access card data while the access card receptacle is within a threshold distance for wireless communication with the data receiver. In some embodiments, the access card receptacle can transmit the access card data while the access card is retained within the access card receptacle. In some embodiments, the access card receptacle can transmit the access card data after the access card is removed from the access card receptacle.

For example, in some embodiments, at a first time, a user can insert an access card into an access card receptacle. In this example, the access card receptacle may not establish wireless communication with a data receiver. Further in this example, the access card data can be obtained and stored by the access card receptacle. Continuing with this example, at a second, subsequent time, the user can remove the access card from the access card receptacle and discard the access card receptacle. Continuing with this example, the access card receptacle can be acquired at a third, subsequent time, and the access card data stored by the access card receptacle can be obtained at the third time (e.g., by establishing communication with a data receiver at the third time).

Figure 5:
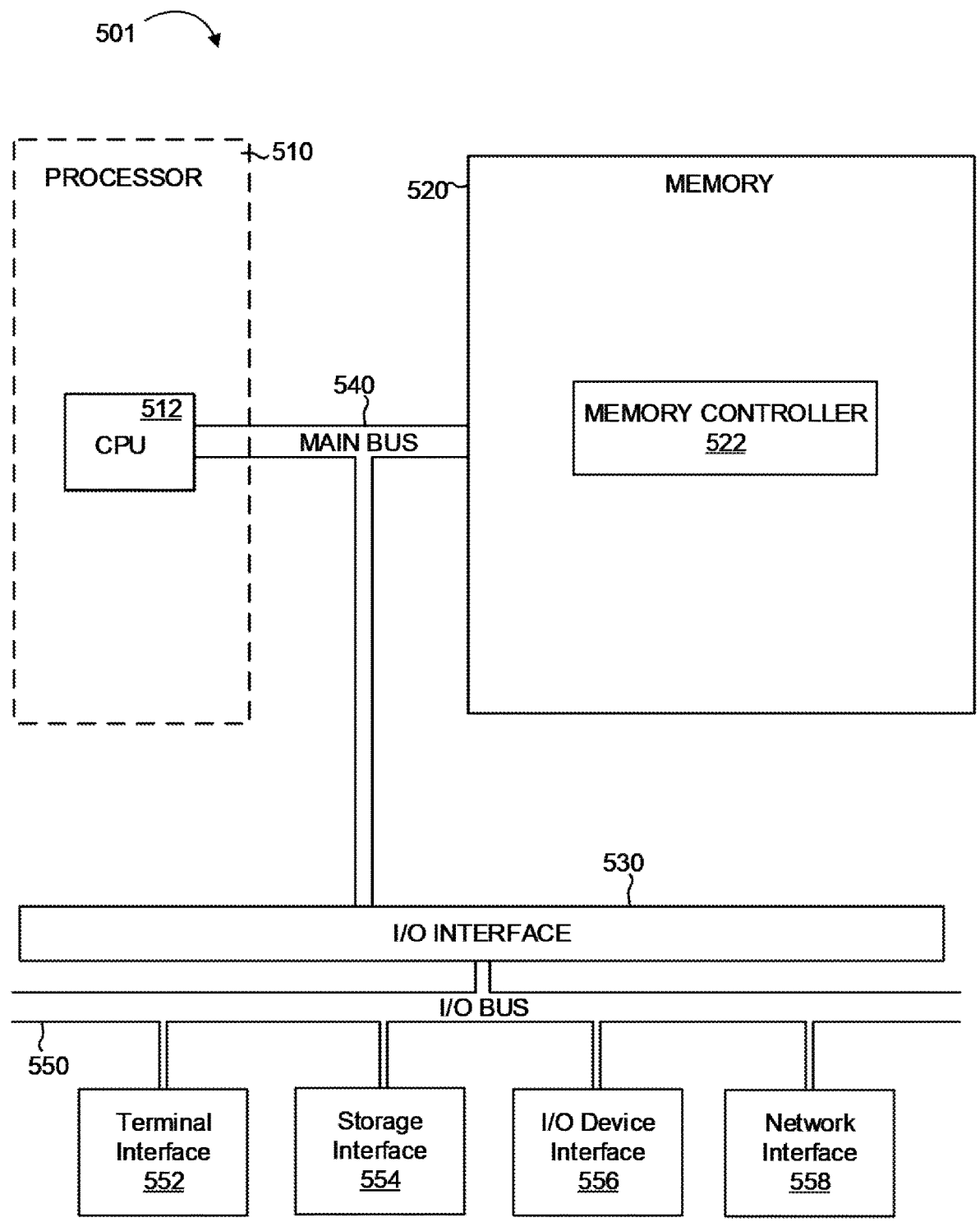
FIG. 5 depicts the representative major components of a computer system that can be used in accordance with embodiments of the present disclosure.

FIG. 5 depicts the representative major components of an exemplary Computer System 501 that can be used in accordance with embodiments of the present disclosure. The particular components depicted are presented for the purpose of example only and are not necessarily the only such variations. The Computer System 501 can include a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or more methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or non-volatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
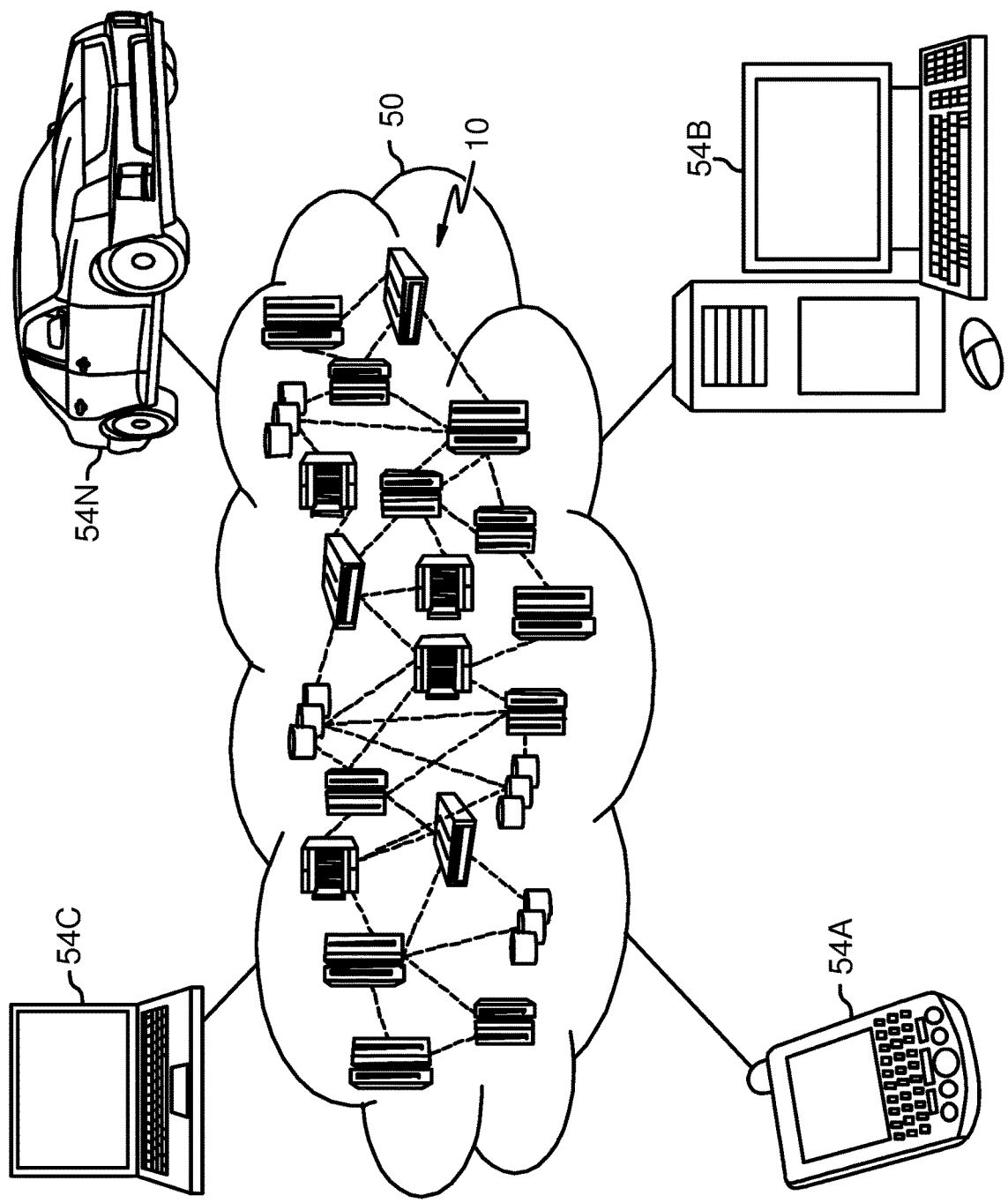
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
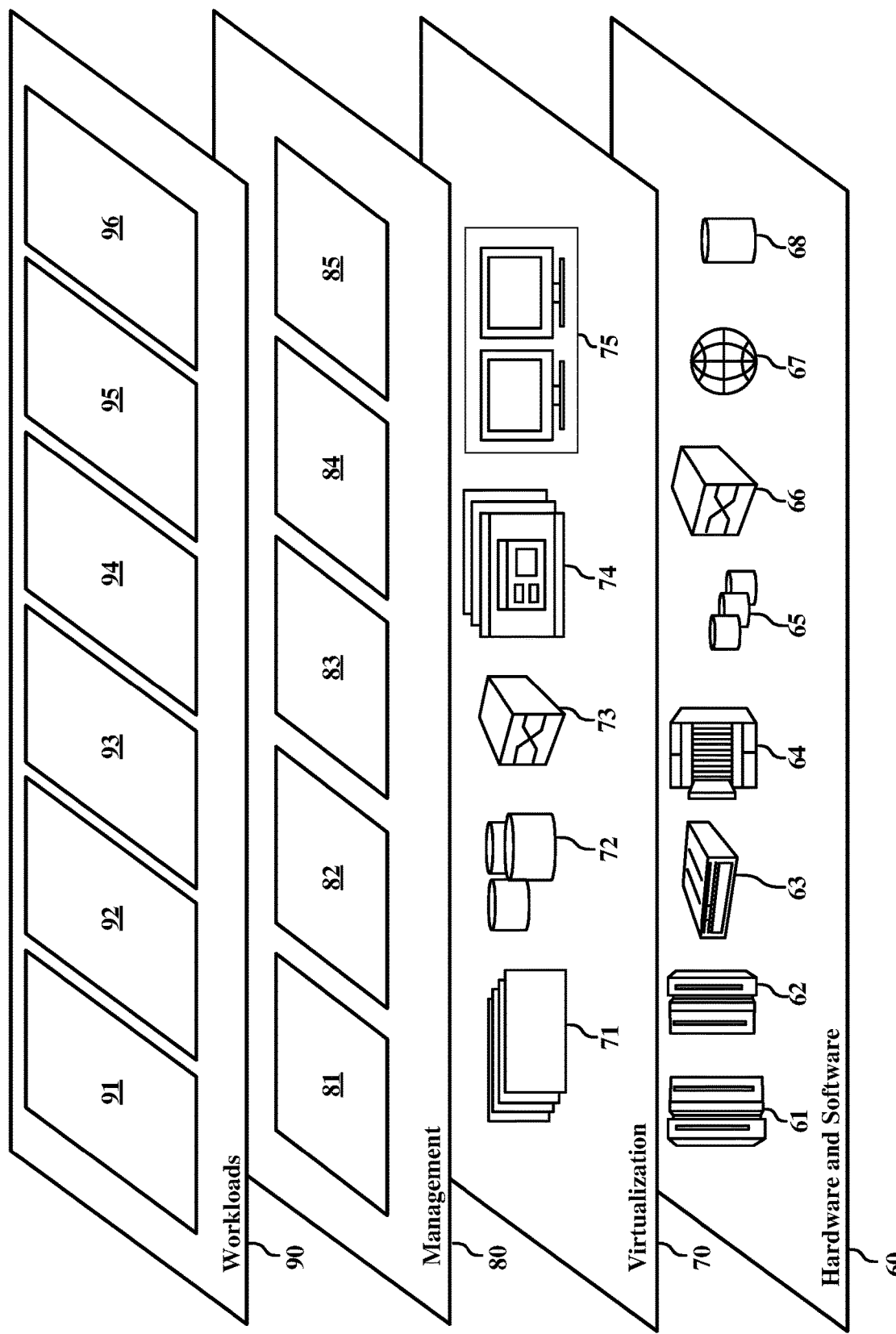
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and penetration testing logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by an access card receptacle, access card data from an access card while the access card is retained within the access card receptacle, the access card receptacle configured to be worn by a user, the access card including accessibility data, wherein the access card is configured to electronically permit access to one or more systems by transmitting the accessibility data, and wherein the access card data comprises at least a portion of the accessibility data;
storing, by the access card receptacle, the access card data; and
transmitting, by the access card receptacle, the access card data to a penetration test system that is configured to test the one or more systems for at least one system vulnerability based, at least in part, on the access card data.

2. The computer-implemented method of claim 1, wherein obtaining the access card data comprises:
obtaining, by a data reader of the access card receptacle, the access card data in response to a power supply of the data reader responding to a wireless interrogation signal.

3. The computer-implemented method of claim 1, wherein transmitting the access card data occurs while the access card is retained within the access card receptacle.

4. The computer-implemented method of claim 3, wherein transmitting the access card data occurs while the access card receptacle is within a threshold distance of a data receiver.

5. The computer-implemented method of claim 1, wherein transmitting the access card data occurs after the access card is removed from the access card receptacle.

6. The computer-implemented method of claim 1, wherein:
the access card receptacle comprises a data reader and a switch, the switch triggered by the access card in response to the access card receptacle receiving the access card, and
wherein obtaining the access card data comprises obtaining, by the data reader, the access card data in response to the switch being triggered by the access card.

7. The computer-implemented method of claim 1, wherein the penetration test system is further configured to obtain penetration data and to generate an attack profile, the attack profile including information corresponding to the at least one system vulnerability.

8. A system comprising:
a processor; and
a memory in communication with the processor, the memory containing program instructions that, when executed by the processor, are configured to cause the processor to perform a method, the method comprising:
obtaining, by an access card receptacle, access card data from an access card while the access card is retained within the access card receptacle, the access card receptacle configured to be worn by a user, the access card including accessibility data, wherein the access card is configured to electronically permit access to one or more systems by transmitting the accessibility data, and wherein the access card data comprises at least a portion of the accessibility data;
storing, by the access card receptacle, the access card data; and
transmitting, by the access card receptacle, the access card data to a penetration test system that is configured to test the one or more systems for at least one system vulnerability based, at least in part, on the access card data.

9. The system of claim 8, wherein obtaining the access card data comprises:
obtaining, by a data reader of the access card receptacle, the access card data in response to a power supply of the data reader responding to a wireless interrogation signal.

10. The system of claim 8, wherein the penetration test system is further configured to obtain penetration data and to generate an attack profile, the attack profile including information corresponding to the at least one system vulnerability.

11. The system of claim 10, wherein generating the attack profile includes comparing the access card data to the penetration data, wherein the penetration data includes information corresponding to a flaw of the access card.

12. The system of claim 10, wherein generating the attack profile includes comparing the access card data to the penetration data, wherein the penetration data includes published information corresponding to a vulnerability of the access card.

13. The system of claim 10, wherein the penetration test system is further configured to test the one or more systems for at least one system vulnerability using the attack profile.

14. The system of claim 8, wherein:
the access card receptacle comprises a data reader and a switch, the switch triggered by the access card in response to the access card receptacle receiving the access card, and
wherein obtaining the access card data comprises obtaining, by the data reader, the access card data in response to the switch being triggered by the access card.

15. A computer program product comprising a computer readable storage medium having program instructions embodied therewith, wherein the computer readable storage medium is not a transitory signal per se, the program instructions executable by a processor to cause the processor to perform a method, the method comprising:

- obtaining, by an access card receptacle, access card data from an access card while the access card is retained within the access card receptacle, the access card receptacle configured to be worn by a user, the access card including accessibility data, wherein the access card is configured to electronically permit access to one or more systems by transmitting the accessibility data, and wherein the access card data comprises at least a portion of the accessibility data;
- storing, by the access card receptacle, the access card data; and
- transmitting, by the access card receptacle, the access card data to a penetration test system that is configured to test the one or more systems for at least one system vulnerability based, at least in part, on the access card data.

16. The computer program product of claim 15, wherein obtaining the access card data comprises:

- obtaining, by a data reader of the access card receptacle, the access card data in response to a power supply of the data reader responding to a wireless interrogation signal.

17. The computer program product of claim 15, wherein transmitting the access card data occurs while the access card is retained within the access card receptacle.

18. The computer program product of claim 17, wherein transmitting the access card data occurs while the access card receptacle is within a threshold distance of a data receiver.

19. The computer program product of claim 15, wherein:

- the access card receptacle comprises a data reader and a switch, the switch triggered by the access card in response to the access card receptacle receiving the access card, and
- wherein obtaining the access card data comprises obtaining, by the data reader, the access card data in response to the switch being triggered by the access card.

20. The computer program product of claim 15, wherein the penetration test system is further configured to obtain penetration data and to generate an attack profile, the attack profile including information corresponding to the at least one system vulnerability.

\* \* \* \* \*